UNITED STATES PATENT OFFICE.

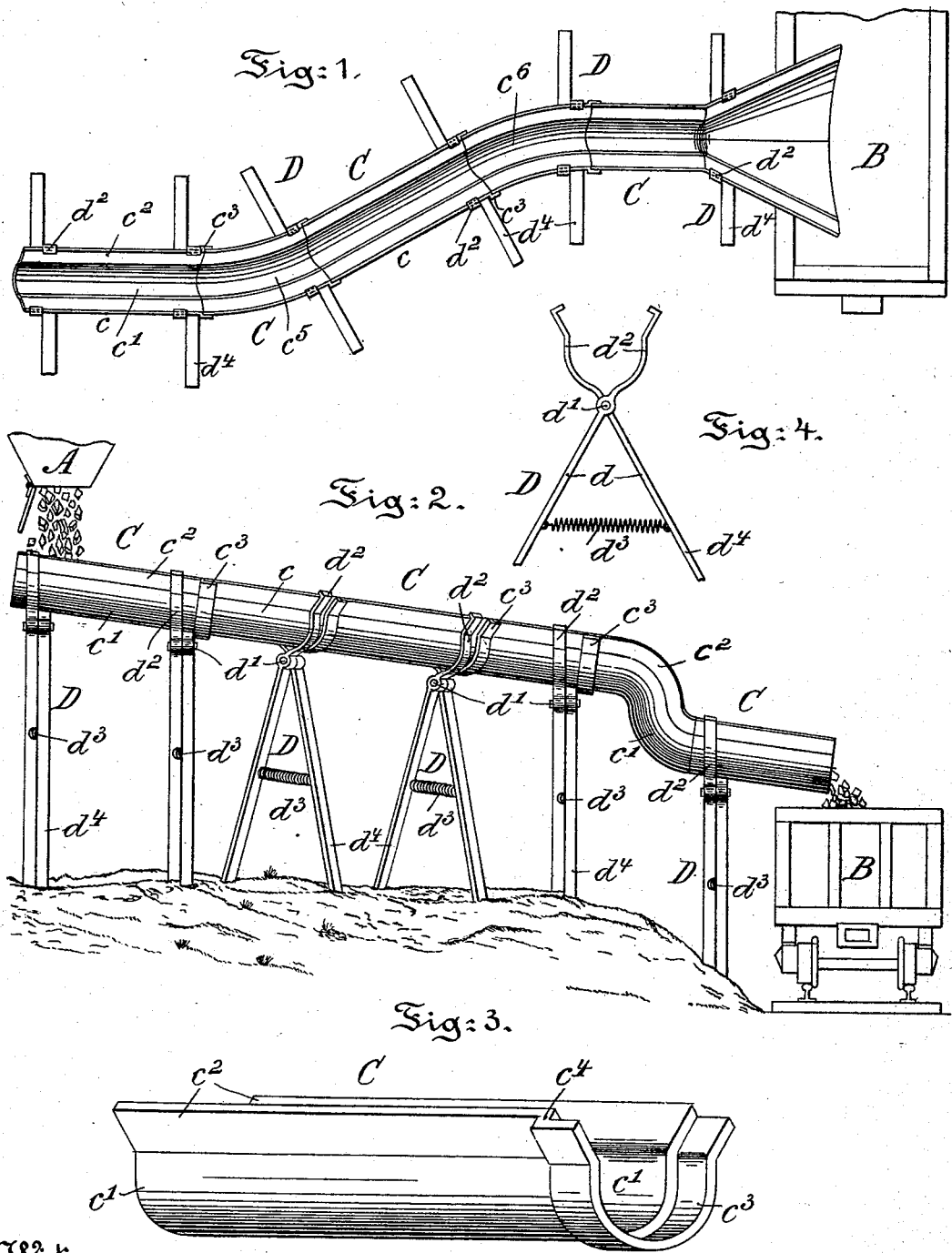

FREDERIC COLLINS, JR., OF PHILADELPHIA, PENNSYLVANIA.

COAL CONVEYER OR CHUTE.

SPECIFICATION forming part of Letters Patent No. 539,797, dated May 28, 1895.

Application filed March 22, 1895. Serial No. 542,744. (No model.)

*To all whom it may concern:*

Be it known that I, FREDERIC COLLINS, Jr., a citizen of the United States, residing at the city of Philadelphia, in the county of Philadelphia and State of Pennsylvania, have invented certain new and useful Improvements in Coal Conveyers or Chutes, of which the following is a specification.

My invention has relation to a coal conveyer or chute in which the trough or conveying tube consists of sections formed of terra-cotta, fire-clay or like material, each section being provided at one end with an integral collar or flange, whereby it may be united to the unflanged end of the next section, the upper portion of the trough having flaring sides or flanges projecting obliquely from a semi-cylindrical or concave base, and controlled props adapted to grip and support the sections.

The principal objects of my invention are, first, to provide an efficient, durable and comparatively inexpensive device adapted to meet the requirements and perform the functions of a first class coal conveyer or chute, and, second, to provide a coal conveyer or chute consisting of a trough or conveying tube of earthen-ware, terra-cotta, fire-clay or similar material formed into sections of peculiar shape and adapted to be readily united to form the chute and to provide such a conveyer or chute with a support consisting of a series of spring controlled props adapted to grip the sections of the trough and support the same in an operative position.

My invention consists of a coal conveyer or chute and a controlled gripping support therefor, constructed and arranged in the manner hereinafter described and claimed.

The nature, characteristic features and scope of my invention will be more fully understood from the following description, taken in connection with the accompanying drawings, forming part hereof, and in which—

Figure 1 is a top or plan view of a conveyer embodying the main features of my invention. Fig. 2 is a side elevation of a conveyer and the spring-controlled gripping-props supporting the same and illustrating in diagram the breaker at the receiving end and the coal-car at the discharge end of the conveyer. Fig. 3 is a perspective view, enlarged, of one of the sections of the conveying-trough; and Fig. 4 is a front elevation of one of the spring-controlled gripping-props supporting the conveyer.

Referring to the drawings, A represents a breaker and B, a coal car or other suitable receptacle for coal conveyed from the breaker A.

C, represents the conveyer or chute and D, the supports or props therefor. The conveyer C, consists of a number of sections $c$, there being five shown in the drawings, consisting of a trough or tube of terra-cotta, fire-clay, earthen-ware or similar material which may be glazed or unglazed, porous or non-porous as necessity requires. Each section $c$, consists of a semi-cylindrical or concave body $c'$, provided at its upper edges with the flaring sides or flanges $c^2$, which are adapted to guide the coal as it drops from the breaker A, into the concave or hollow semi-cylindrical body $c'$, of the conveyer C. By preference, one end of each section $c$, as shown, is provided with the countersunk flange or collar $c^3$, into which the unflanged end of the next succeeding section is adapted to rest and to thereby form on the inside of the body $c'$, an unbroken or unridged path for the coal as it passes along the conveyer C, from the breaker A, to the receptacle or car B. This flange or collar $c^3$, is formed by bending the body $c'$, and flanges $c^2$, downward as indicated at $c^4$, and then outwardly parallel to the main body and the flanges of the section. Each section being made of terra-cotta, fire-clay, earthen-ware material or like substance is readily molded into the form required and after baking retains the form given it in the mold. The use of terra-cotta and similar substances instead of iron or metals is of very great advantage and constitutes an important feature of this invention.

As is well known in coal mines or store houses for coal, metals such as iron, copper and the like are attacked by the sulphurous and other vapors, fumes, &c., from the coal and the metal troughs are speedily eaten into and through by these vapors, &c., and thus destroyed. The sections $c$, are impervious to such vapors, fumes, &c., and may be made strong enough to resist the force of the coal as it drops from the breaker and yet not be as heavy as a similar metallic trough of less thickness.

The conveyer C, is supported by means of a series of gripping supports or props D, which are constructed and arranged, as follows:— Each support or prop D, as illustrated in Fig. 4, consists of the two crossing sticks or props $d$, pivoted as at $d'$, somewhat in the manner as a saw-buck or saw-horse. The upper ends $d^2$, of these props $d$, are cut out or otherwise formed to fit tightly against the curved surfaces of the body $c'$, and the flaring surfaces $c^2$, of the trough $c$, and to hold the trough between the two props $d$. Below the point of pivotal support $d'$, is arranged a spring $d^3$, adapted normally to extend the lower ends $d^4$, of the props $d$, apart and to thereby bring the upper ends $d^4$, of the props $d$, more tightly against the sides of the trough $c$. The props D, thus tightly grip and support at their upper ends the sections $c$, of the conveyer. The number of these props D, depends of course upon the length of the conveyer and the weight thereof. One or more of the sections $c$, of the trough may be curved as indicated at $c^5$ and $c^6$, and the collar $c^3$, of the last section may be lengthened and lowered at a more acute angle to the plane of the conveyer to form a discharge mouth from which the coal may drop into the car or other receptacle B.

If desired the sections $c$, may be made of porous material and particularly would this be advisable where the coal is wet, and the pores in the material would act as perforations or outlets to convey away from the coal any excess of moisture or drip water.

Having thus described the nature and objects of my invention, what I claim as new, and desire to secure by Letters Patent, is—

The combination of a breaker, a conveyer or chute consisting of a series of removable sections of terra cotta or the like, each having a concave body with upper outwardly flaring walls to permit the coal to pass through the chute, each section of the chute being provided at one end with a countersunk flange into which the unflanged end of the next succeeding section is fitted, thereby forming on the inside of the body of the united sections of the chute an unbroken path, and spring-controlled edge-gripping supports engaging the flaring portions of said chute, substantially as described.

In testimony whereof I have hereunto set my signature in the presence of two subscribing witnesses.

FREDERIC COLLINS, JR.

Witnesses:
THOMAS M. SMITH,
RICHARD C. MAXWELL.